United States Patent

[11] 3,584,206

[72] Inventor John T. Evans
Waynesboro, Va.

[21] Appl. No. 709,386
[22] Filed Feb. 29, 1968
[45] Patented June 8, 1971
[73] Assignee General Electric Company

[54] SERIAL BCD ADDER/SUBTRACTER/COMPLEMENTER UTILIZING INTERLACED DATA
14 Claims, 10 Drawing Figs.

[52] U.S. Cl. 235/170, 235/176
[51] Int. Cl. G06f 7/50
[50] Field of Search 235/169, 176, 170

[56] References Cited

UNITED STATES PATENTS

| | | | |
|---|---|---|---|
| 2,872,107 | 2/1959 | Burkhart | 235/170 |
| 2,799,450 | 7/1957 | Johnson | 235/169 |
| 2,933,252 | 4/1960 | Lanning | 235/176 |
| 3,062,446 | 11/1962 | Womersley et al. | 235/170 |
| 3,083,910 | 4/1963 | Berkin | 235/170 X |
| 3,112,396 | 11/1963 | Heywood | 235/170 |
| 3,317,721 | 5/1967 | Berlind | 235/176 |

*Primary Examiner*—Malcolm A. Morrison
*Assistant Examiner*—David H. Malzahn
*Attorneys*—William S. Wolfe, Gerard R. Woods, Frank L. Neuhauser, Oscar B. Waddell and Joseph B. Forman

ABSTRACT: A serial digital adder/subtracter/complementer for binary coded decimal data presented in interlaced format. The data at each input comprises a series of multidigit decimal words interlaced by serially presenting the least significant digit of each word in predetermined sequence, followed by the next digit of each word similarly interlaced and so on throughout the data. The adder/subtracter/complementer utilizes a first full adder/subtracter for adding or subtracting the input data. The system allows selection of either addition or subtraction and, when subtracting, designates the minuend and subtrahend. The output of the first full adder is passed through three bits of delay to one input of a second full adder/subtracter. As each digit is manipulated, it is examined to see if an incorrect result, i.e., a sum in excess of nine or a negative difference has been generated. If so, the number six (6) in binary coded decimal is fed to a second input of the second adder/subtracter where it is added to or subtracted from the output of the first adder/subtracter to accomplish the necessary correction from binary to binary coded decimal. The second full adder/subtracter is modified so as to permit generation of the two's complement of a BCD digit applied at its input.

INVENTOR.
JOHN T. EVANS
BY *Michael Masnik*
HIS ATTORNEY

INVENTOR.
JOHN T. EVANS
BY Michael Masnik
HIS ATTORNEY

INVENTOR.
JOHN T. EVANS
BY Michael Masnik
HIS ATTORNEY

INVENTOR.
JOHN T. EVANS
BY Michael Masnik
HIS ATTORNEY

INVENTOR.
JOHN T. EVANS
BY Michael Masnik
HIS ATTORNEY

INVENTOR.
JOHN T. EVANS
BY Michael Masnik
HIS ATTORNEY

INVENTOR.
JOHN T. EVANS
BY Michael Masnik
HIS ATTORNEY

SERIAL BCD ADDER/SUBTRACTER/COMPLEMENTER UTILIZING INTERLACED DATA

BACKGROUND OF THE INVENTION

This invention relates to a serial adder/subtracter/complementer for the processing of digital data presented in coded group form. More specifically, the invention relates to such a processor for digital data in binary coded decimal form which is interlaced according to a particular format.

Serial adder/subtracters for digital data in binary coded decimal (BCD) form are well known. Since these adder/subtracters operate in pure binary and the input data is in BCD, it is necessary to effect corrections after certain results, due to the difference in the radix of notation. A typical adder of the known type utilizes a first full adder/subtracter to add or subtract the input data in pure binary fashion. The resulting output is fed into delay devices which store this result. At the end of the addition or subtraction of each digit, auxiliary circuitry examines the number stored in the delay devices. If the number stored is in excess of nine or if a binary carry/borrow was generated during the processing of the most significant bit of the digit, there is an improper result which must be corrected by the addition or subtraction of six. Accordingly, a six in BCD form is generated and fed to one input of a second adder/subtracter. The tentative sum or difference generated in the first adder/subtracter is shifted out of the delay devices to a second input of the second adder/subtracter where the necessary addition or subtraction of six is accomplished. The correct result is then taken from the output of this second adder/subtracter. Such a system is utilized then to add or subtract two inputs presented in conventional serial fashion.

In certain applications, particularly control systems for machine tools, it is desired to present the data in an interlaced fashion. The data is interlaced by presenting several words, i.e., multidigit decimal numbers, in an interwoven fashion. The data is interlaced by first presenting the least significant digit of the first word in BCD form with the BCD bits arranged in ascending order. This is followed by the least significant digit of each successive word, similarly encoded and arranged. After the least significant digits are presented, the next to least significant digits are presented, beginning again with the first word and proceeding through all the successive words. If, for example, the three two-digit words; 28, 86 and 71, are to be interlaced in that order, the data would appear as follows:

0001(8) 0110(6) 1000(1) 0100(2) 0001(8) 1110(7)

This method of interlacing is particularly useful in applications where it is desired to add two words on a repetitive basis since it is only necessary to delay each digit of the first word and then add the two words on a digit-by-digit basis.

It will be apparent, however, that it is not possible to utilize BCD adders known in the prior art to add data in this format, primarily due to the problem of handling interdigital carries.

Accordingly, it is an object of this invention to provide a serial BCD adder/subtracter/complementer for handling interlaced data in the format described.

The problem alluded to above, the handling of interdigital carries, results from the fact that after the processing of the first digit of a particular word there may be an interdigital carry which must be utilized when the next digit of this word is operated on. However, due to the data format, this next digit does not appear until after the other interlaced words have been processed.

Accordingly, it is an object of this invention to selectively store and relay interdigital carries during the processing of interlaced data.

An object of this invention is to provide an improved signal processing arrangement.

In the processing of data for numerical control systems, it is often necessary to accumulate data representative, for example, of the present physical location of various machine axes. Such data for each axis is commonly referenced to a predetermined axis location which is designated as the "zero" for that particular axis. Data indicative of motion in one direction is designated as positive motion and is added to the accumulated data so as to reflect the present position. By the same token, motion in the opposite direction is designated as negative motion and is subtracted form the accumulated data.

For example, if a particular machine axis is originally positioned at its "zero" position, and then moves a number of units in the positive direction, it will be necessary to add this number of units to the previous position, i.e., zero, to reflect the new position. Similarly, if the axis is then moved a number of units in the opposite direction, this number must be subtracted from the previous position. The additions and subtractions can be readily accomplished by the adder/subtracter/complementer comprising this invention.

The following example will illustrate operation under these conditions. The first column indicates the previous axis position, the second column indicates the amount of axis motion since the last computation and the third column reflects the result of adding or subtracting the number in column two to or from the number in column one. Note that the newly computed position shown in column three then forms the previous position in column one of the next row.

| | Column 1, previous position | Column 2, axis motion | Column 3, new position |
|---|---|---|---|
| Step 1 | 0000 | +0005 | 0005 |
| Step 2 | 0005 | +0002 | 0007 |
| Step 3 | 0007 | −0004 | 0003 |
| Step 4 | 0003 | −0005 | 9998(−0002) |

In Step 1, the initial axis position is zero to which a positive motion of five units is added resulting in a new position of 0005. In Step 2, a positive motion of two units is added to the previous position, 0005, resulting in a new position of 0007. In Step 3, a negative motion of four units is recorded, requiring a subtraction from the previous position, 0007, and resulting in a new position, 0003. Finally, in Step 4, a negative motion of five units is recorded which, when subtracted from the previous position, 0003, results in a new position, shown as 9998 which would be the result if a conventional adder/subtracter of the known type was utilized. This new position, 9998, is actually a position two units to the negative side of the zero position and would be more accurately represented by −0002, which is the complement of 9998.

Accordingly, it is an object of the present invention to provide an adder/subtracter which will compute the complement of the result of any subtraction which results in a negative number.

SUMMARY OF THE INVENTION

This invention provides for the selection addition or subtraction of interlaced input data and provides for the sequential relaying and storage of interdigital carries. In addition, the invention provides for complementing the result of any subtraction which results in a negative number and relays the result of this subtraction as a true negative number.

BRIEF DESCRIPTION OF THE DRAWINGS

While the specification concludes with claims particularly pointing out what is considered to be the invention, reference to the attached drawings in conjunction with the specifications will illustrate a particular embodiment thereof.

THE CLOCK OSCILLATOR AND TIMING CIRCUITS

Figure 2:
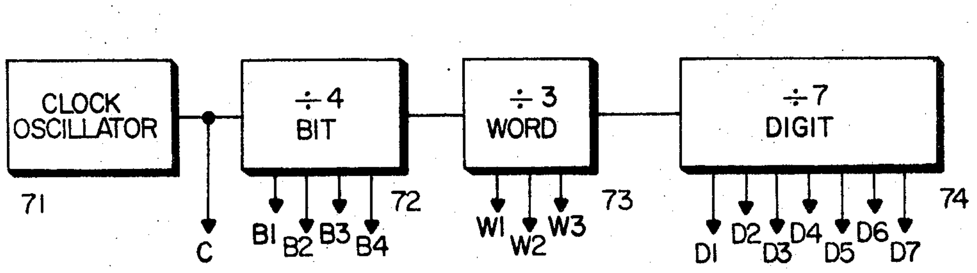
FIG. 2 is a block diagram of the clock oscillator and timing circuit.
Figure 3:
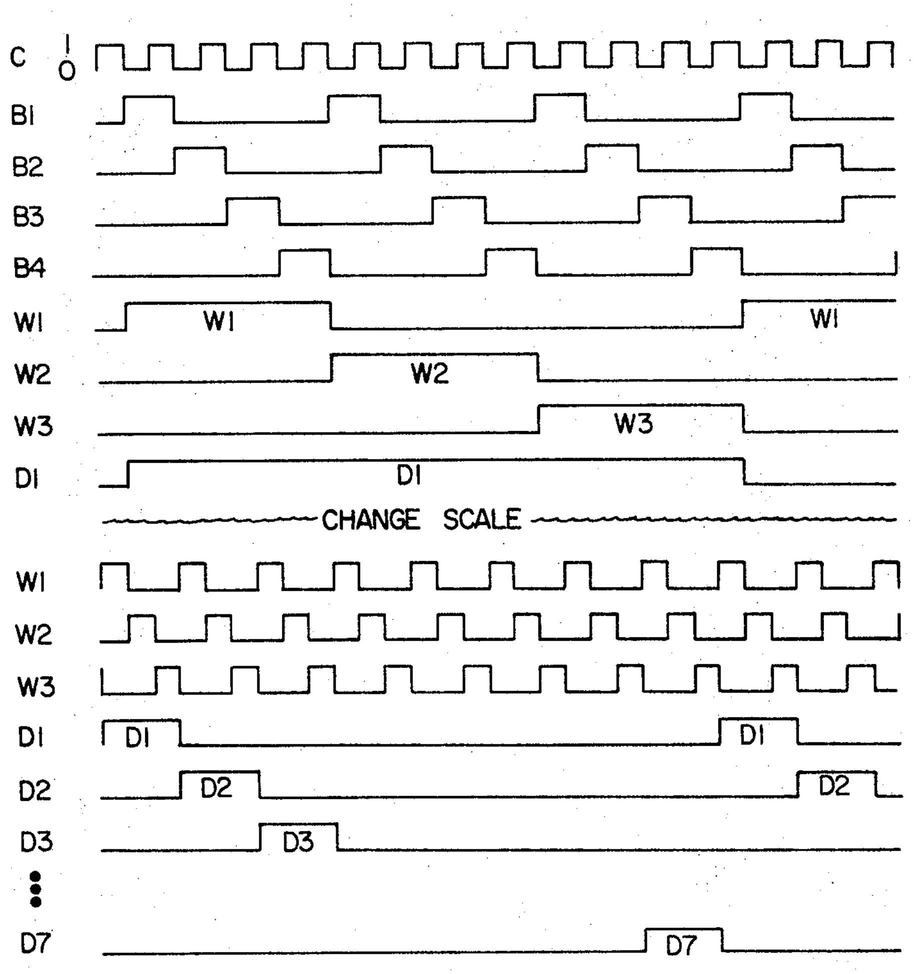
FIG. 3 is a timing diagram showing the waveforms of the clock oscillator and timing circuit of FIG. 2.

Turning first to FIG. 2, there is shown a main clock oscillator and the timing and synchronizing circuits of the subject invention. A clock oscillator 71 generates the main clock signal C which may be, for example, 5 mHz. The output of the clock oscillator 71 is fed into a suitable divider circuit 72 which divides the main clock signal into four parts. This divider circuit 72 may consist, for example, of a series of shift registers, or, alternatively, may be a counter of the well known type. The signals generated by the divide by 4 circuit 72 are shown in FIG. 3 as signals B1, B2, B3 and B4. These signals are used to synchronize the presentation of the four binary bits of interlaced data, in ascending order. Hence, during B1 time, the first binary bit of a BCD number is present at the input of the adder/subtracter/complementer of the present invention. Similarly, during B2 time the second bit is present at the input. During B3 time, bit 3 is present and during B4 time, bit 4 is present. The divide by 4 counter 72 then feeds into a divide by 3 counter 73, which may be similarly constructed and constitutes means for generating signals indicative of the 3 interlaced words. These signals, shown in FIG. 3, are signals W1, W2 and W3. Accordingly, when signal W1 is present, this indicates that word 1 is presently being processed. The presence of signal W2 indicates that word 2 is being processed and signal W3 indicates the presence of word 3. The divide by 3 counter 73 feeds into a divide by 7 circuit 74 for generating signals indicative of the 7 digits. It should be pointed out, at this time, that the subject invention is not necessarily limited to use with three words or 7 digits but may accommodate any number of words and digits by appropriately changing the configuration of the clock oscillator and timing circuit. The outputs of the divide by 7 circuit 74 are D1—D7. Signal D1 indicates the presence of the first or least significant digit, D2 indicates the second or next to least significant digit and so forth. These outputs are shown in FIG. 3. FIG. 3 is, at this point, altered with a change of scale by representing signals W1, W2 and W3.

It will be seen, then, that the signals B1 through B4, W1 through W3, and D1 through D7 are sufficient to completely identify a particular bit upon its presentation at the input of the adder/subtracter/complementer of the subject invention. In this fashion, a signal which occurs at B1, W1, D1 time indicates that this is the first bit of the first word, least significant digit. Similarly, during B3, W2, D2 time, the third bit of the second word, next to least significant digit is presently being presented. Hereinafter, these timing signals will be referred to simply as B3W2D2 time.

ILLUSTRATION OF INTERLACING

Referring now to FIG. 3, there is shown an illustration of data interlaced as set forth above. For identification purposes the signals B1 through B4, W1 through W3 and D1—2 are set forth at the top of FIG. 4. If it is desired to interlace the three two-bit words 28, 86 and 71, in that order, reference is now made to the signal shown as PRI. The first word being 28, and interlacing occurring beginning with the least significant digit of word 1 and in the ascending order of the binary coded decimal format, it is shown that this digit is represented during W1D1 time, the presence of a logic "1" at B4W1D1 time indicating the number 8 in BCD. Having represented the least significant digit of the first word, it is now necessary to represent the least significant digit of the second word, 86. Accordingly, the signal PRI goes to the logic "1" state during B2W2D1 time and B3W2D1 time, thereby representing the number 6 in binary coded decimal form. Next, it is necessary to represent the least significant digit of the third word, 71. Accordingly, the signal PRI goes to logic "1" at B1W3D1 time. Having now interlaced the three least significant digits of each word, it is necessary to interlace the next digits, beginning again at word 1. Accordingly, since word 1 is 28, signal PRI goes positive at B2W1D2 time thereby indicating the digit 2 in BCD form. It is now necessary to interlace the second digit of word 2 which is 86 and accordingly signal PRI goes to logic "1" at B4W2D2 time thereby indicating the number 8 in binary coded decimal form. Finally, it is necessary to write the number 7, it being the next significant digit of word 3 which is 71. Accordingly, signal PRI goes to logic "1" during B1W3D2, and B2W3D2, and B3W3D2 time, thereby representing the digit 7 in binary coded decimal form.

Figure 4:
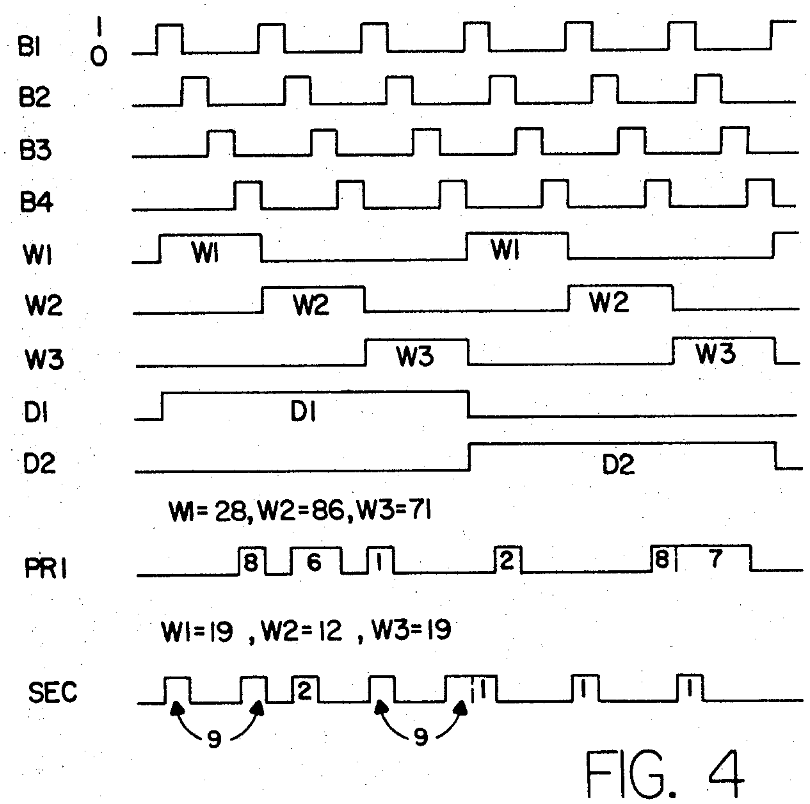
FIG. 4 is a timing diagram showing the waveforms of the input data in interlaced format.

The signal SEC, in FIG. 4, represents a similar interlacing of three more two-digit words, namely 19, 12 and 19 in that order.

Operation of the Adder/Subtracter/Complementer

Figure 1:
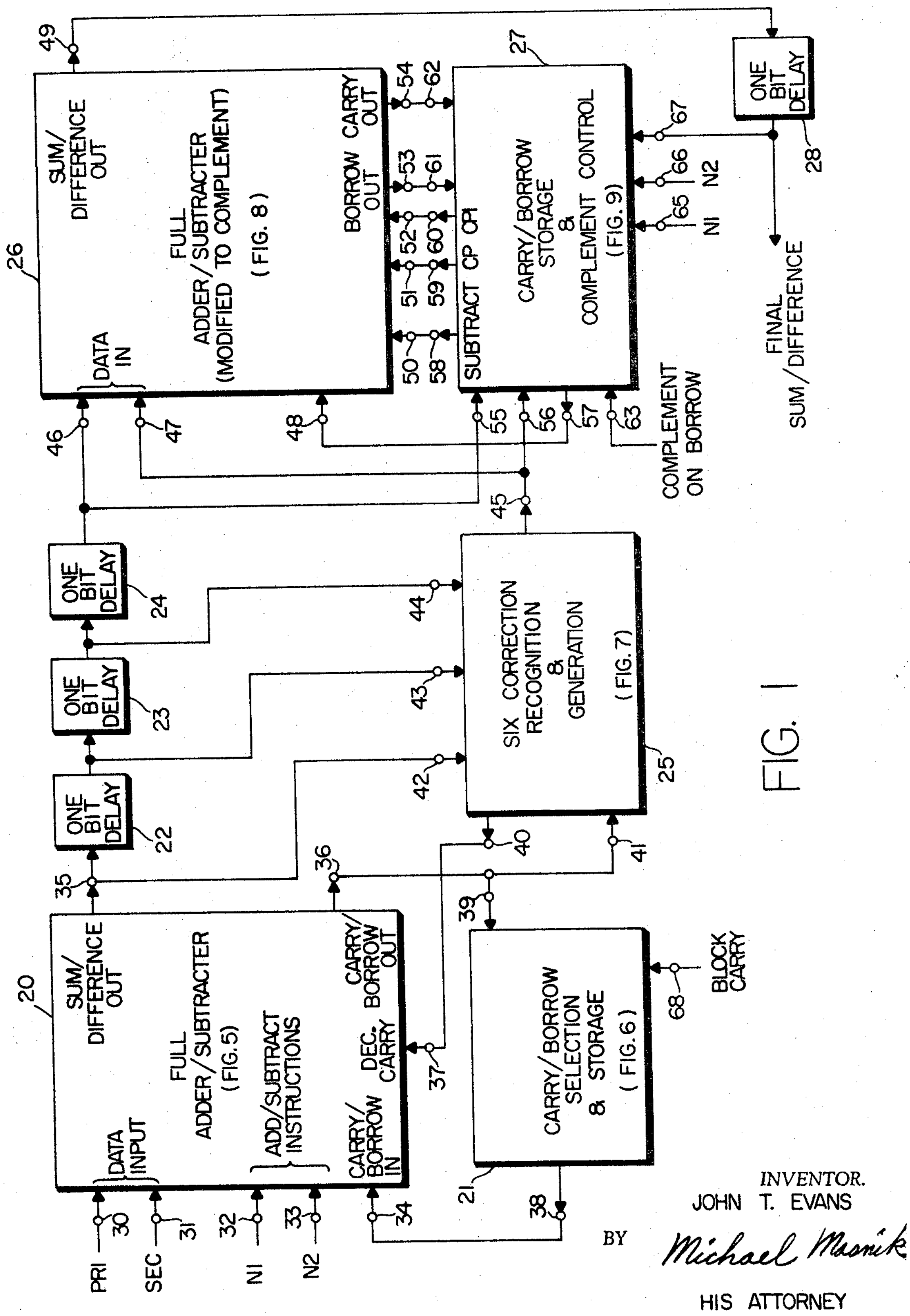
FIG. 1 is a block diagram illustrating the serial adder/subtracter/complementer comprising the invention.

Referring now to FIG. 1, there is shown in block diagram form the adder/subtracter/complementer comprising the present invention. FIrst adding means comprising a full Adder/Subtracter 20 are provided to compute the sum or difference of the input data labeled PRI at input terminal 30 and SEC at input terminal 31. The input data is transmitted to Full Adder/Subtracter 20 on a bit-by-bit basis and the one bit sum or difference is presented at output terminal 35.

Signals N1 and N2 are applied at terminals 32 and 33 respectively to relay the necessary instruction to Full Adder/Subtracter 20 to indicate when the desired operation is to be PRI + SEC, PRI − SEC or SEC − PRI. These instructions indicate the desired operation according to the following table:

TABLE 1

| N1 | N2 | Operation |
|---|---|---|
| 0 | 0 | PRI+SEC. |
| 1 | 0 | PRI−SEC. |
| 0 | 1 | SEC−PRI. |
| 1 | 1 | Not allowed. |

Any carries or borrows which result during the computations in Full Adder/Subtracter 20 are relayed out of Full Adder/Subtracter 20 on terminal 36. Similarly, any carries or borrows to be relayed into Full Adder/Subtracter 20 are received on terminal 34.

The output of Full Adder/Subtracter 20 is relayed from terminal 35 to a plurality of storage means, the first of which is One Bit Delay 22. This one bit delay may be, for example, a clocked shift register or any other one bit delay device known in the art. The output of One Bit Delay 22 is relayed to a similar One Bit Delay 23 whose output is then fed into the input of another similar One Bit Delay 24. Hence, the output of One Bit Delay 24 is the same as the output of Full Adder/Subtracter 20, delayed by three bit times. A Carry/Borrow Selection and Storage Circuit 21 is provided as second storage means for selectively storing and relaying any carries or borrows which are generated in Full Adder/Subtracter 20. These carries may be either binary carries, i.e., resulting from the processing of the binary bits of a particular digit or they may be decimal carries which are fed into Full Adder/Subtracter 20 by terminal 37. Carry/Borrow Selection and Storage Circuit 21 will be described in more detail hereinafter but in summary, its operation is such that it selectively stores carries and borrows according to the particular word with which they are associated and then relays them to the Carry/Borrow In terminal 34 of Full Adder/Subtracter 20 in the same sequence in which they were generated and stored. As will be pointed out in detail hereinafter it is sometimes desirable to suppress carries or borrows generated in Full Adder/Subtracter 20 and stored in Carry/Borrow Selection Storage Circuit 21. Accordingly, the signal Block Carry is applied to input terminal 68 and is operative to suppress any carries or borrows previously stored.

As pointed out above, since operation is in pure binary whereas the input data is in binary coded decimal there is a need to correct certain improper results which may be generated by Full Adder/Subtracter 20. These improper results consist of a sum of inputs which exceeds nine in the case of addition, or a negative difference in the case of subtraction. As was also pointed out above, there are three One Bit Delay units 22, 23, 24, provided to receive and store the output of Full Adder/Subtracter 20. It will be seen that after the complete addition or subtraction of a digit in binary coded decimal, the least significant, or first, binary bit will be displayed at the output of One Bit Delay 24, the next, or second, binary bit will be displayed at the output of One Bit Delay 23. The third bit is displayed at the output of One Bit Delay 22 and the fourth bit at the output of Full Adder/Subtracter 20.

The Six Correction Recognition and Generation Circuit 25 examines, during B4 time, the contents of One Bit Delay units 22, 23 as well as the most significant bit which is presently at output terminal 35 of Full Adder/Subtracter 20 to see if the sum generated by Full Adder/Subtracter 20 exceeds nine. However, if the sum of the inputs exceeds 15, this will not be recognized by examining the sum itself but rather will be indicated by the presence of a carry from Full Adder/Subtracter 20 during bit 4 (B4) time. Similarly, an improper result during subtraction is indicated by the presence of a borrow during bit 4 time. Hence, the Carry/Borrow Output terminal 36 of Full Adder/Subtracter 20 is also provided as an input to the Six Correction Recognition and Generation Circuit 25 by way of input terminal 41.

If the Six Correction Recognition and Generation Circuit 25 recognizes the need for a correction, this is also indicative of a digital or decimal carry which is then relayed by output terminal 40 of the Six Correction Recognition and Generation Circuit 25 to input terminal 37 of Full Adder/Subtracter 20 so that it can be appropriately stored in Carry/Borrow Selection and Storage Circuit 21. In addition, when the Six Correction Recognition and Generation Circuit 25 recognizes the need for a correction, the number six in binary coded decimal (0110) is generated at output terminal 45. On the other hand, if there is no need for a correction, the signal on output terminal 45 will remain at logic zero level thereby representing the number zero (0000) in binary coded decimal.

Second adding means comprising Full Adder/Subtracter 26 are provided to add together the sum or difference generated in Full Adder/Subtracter 20 to the output of the Six Correction Recognition and Generation Circuit 25. The output of Full Adder/Subtracter 20 is then relayed through the three One Bit Delay units 22, 23 and 24 and fed into Full Adder/Subtracter 26 on input terminal 46. Similarly, the output of the Six Correction Recognition and Generation Circuit 25 is relayed from its output terminal 45 to input terminal 47 of Full Adder/Subtracter 26. The result of the addition or subtraction in Full Adder/Subtracter 26 is presented at output terminal 49. Any carries or borrows generated in full Adder/Subtracter 26 are relayed by output terminals 54 and 53, respectively. In addition, terminal 48 receives any carries or borrows which are relayed from the Carry Borrow Storage and Complement Control 27 which is explained in detail hereinafter. Finally, input terminal 50 of Full Adder/Subtracter 26 is provided to receive a signal indicative of whether the operation in Full Adder/Subtracter 26 is to be addition or subtraction.

The Carry/Borrow Storage and Complement Control 27 has two functions. Its first function is the storing and relaying of carries or borrows to Full Adder/Subtracter 26. In addition, Carry/Borrow Storage and Complement Control 27 operates to instruct the Full Adder/Subtracter 26 (which has been modified) so as to provide on its output the decimal complement of the input. Since the input in in BCD, this is accomplished by generating the two's complement. Hence, the output terminals 59 and 60 of Carry/Borrow Storage and Complement Control 27 are connected to input terminals 51 and 52 of Full Adder/Subtracter as for the purpose of instructing this modified Full Adder/Subtracter 26 to provide the two's complement of the input presented at terminal 46.

Finally, the output of Full Adder/Subtracter 26 is fed into a fourth One Bit Delay 28 whose output is indicative of the Final sum or difference of the input data, in either its true binary coded decimal form or in the two's complement of the difference generated in Full Adder/Subtracter 20.

The detailed operation of the adder/subtracter/complementer shown in FIG. 1 will be pointed out in parts hereinafter when the logic diagrams of the particular components are discussed in detail.

Description of the Logic Elements

Before turning to a detailed discussion of FIGS. 5—9 which show the logic diagrams of the particular components of the full adder/subtracter/complementer comprising the invention, it will be necessary to describe briefly the NAND logic elements which are used to made up these particular components. It should be pointed out, however, that while the invention is illustrated by NAND logic elements, any type of logic, either negative or positive, could be utilized without departing from the spirit of the invention.

While it is true that only the one type of gate, i.e., a NAND gate is used, these gates are denoted in two forms in the logic diagrams, according to the desired operation of the gate. As is well known, a multiinput NAND gate will gave a logic zero at its output terminal if and only if all of its inputs are at logic 1 level. Accordingly, any time any of its inputs are at logic zero level, the output will be a logic 1 level.

Figure 5:
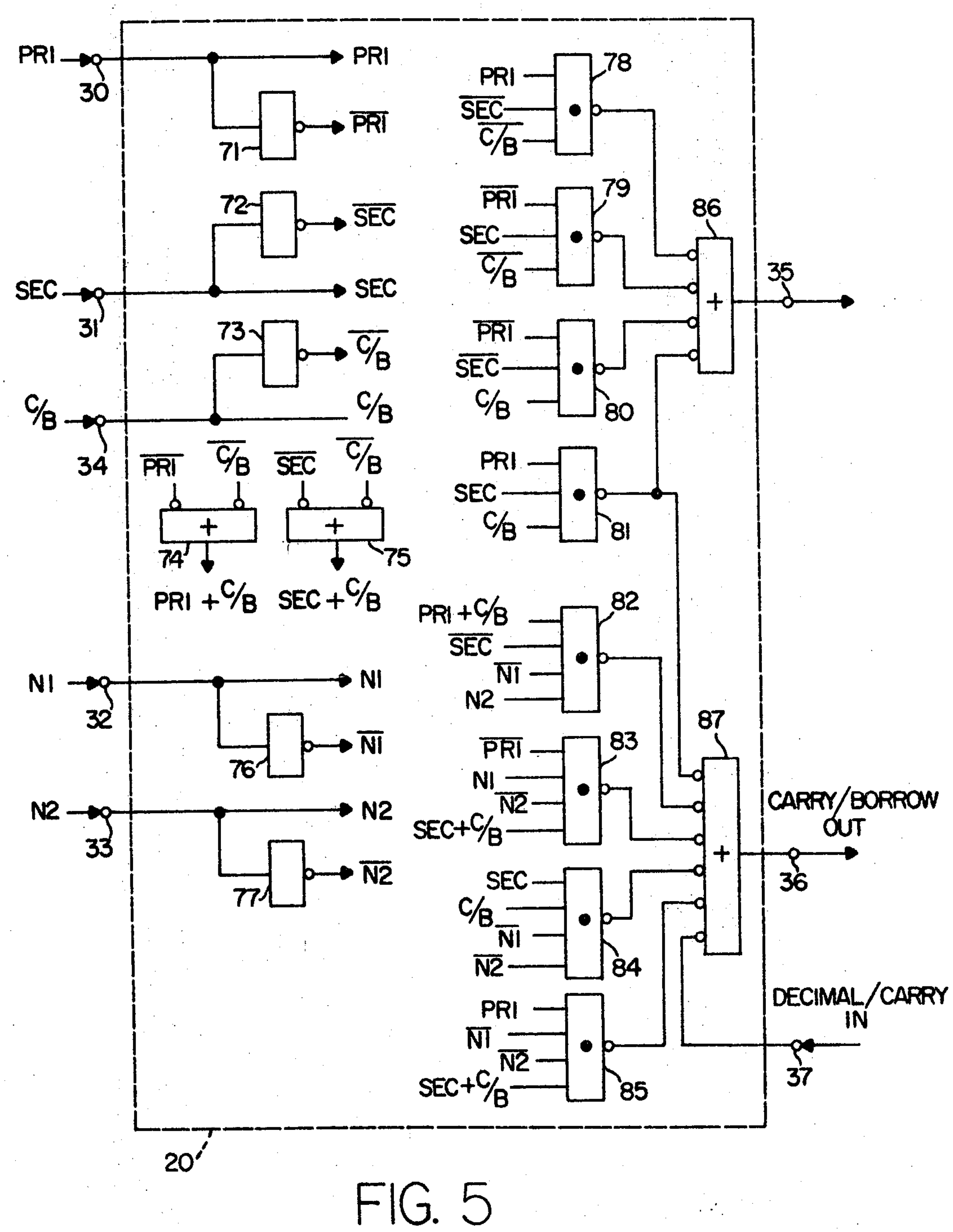
FIG. 5 is a logic diagram of the first "Full Adder/Subtracter" of FIG. 1.

In FIG. 5, there is shown a three input NAND gate 78 whose inputs do not have circles and whose output does have a circle. In the middle of the gate is a dot indicating that the desired mode of operation of this particular NAND gate is as an "AND" gate. Accordingly, the desired operating condition for this gate is when there is a logic one at all three of its inputs, the output will be at logic zero.

On the other hand, NAND gate 86 is shown with circles at all its inputs and no circle on its output. In addition, there is a plus sign in the middle indicating that the desired operation of this gate is as an "OR" gate such that the presence of a logic zero at any of its four inputs results in a logic one at its output.

While the above description has pertained particularly to a three input and a four input gate, it should be pointed out that the number of inputs is immaterial, since all inputs of a NAND gate, regardless of number, must be at logic one before the output of the multiple input gate is at logic zero.

The logic element denoted 71 in FIG. 5 is a simple inverter whose operation is such that a logic one at its input (denoted without a circle) results in a logic zero at its output (denoted by the circle). Conversely, the presence of a logic zero at its input results in a logic one at its output.

Figure 6:
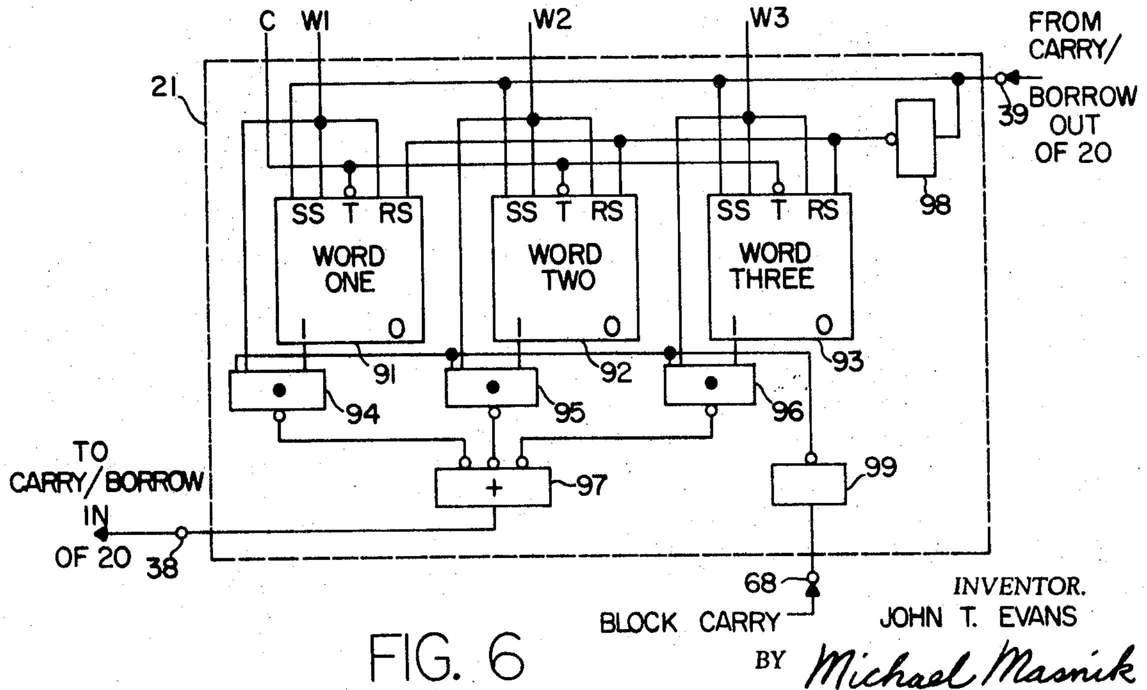
FIG. 6 is a logic diagram of the "Carry/Borrow Section and Storage" circuit shown in FIG. 1.

In FIG. 6, the logic element denoted "Word One" is a standard J-K flip-flop 96. As is well known, a J-K flip-flop conventionally has several input terminals for set steering (denoted SS), all of which must be at logic "1" to steer the flip-flop to set. Similarly, there are provided several input terminals for reset steering (denoted RS), all of which must be at logic "1" to steer the flip-flop to reset. The trigger terminal (denoted T) requires, as indicated by the circle at that input, a signal going to logic "0" to trigger the flip-flop. If both set and reset steering requirements are met simultaneously, the next trigger signal will cause the flip-flop to change state, i.e., set if it was previously reset and reset if it was previously set. The two outputs shown labeled 1 and 0 reflect the logic signal present during the set state. When the flip-flop resets these signals assume the opposite state, i.e., output 0 goes to logic "1" and output 1 goes to logic "0."

In order to cause the flip-flop to set, the set steering inputs must be at logic "1" prior to the arrival of a logic "0" at the trigger. Hence, if the set steering inputs SS go to logic "1"

simultaneously with the arrival of a logic "0" at the trigger T, the flip-flop will not set. On the other hand, if the steering terminals go to logic "1" prior to the arrival of a logic "0" at the trigger T but one or more of the steering inputs change to logic "0" at the same time the trigger goes to logic "0," the flip-flop will set.

Operation of Full Adder/Subtracter 20

As pointed out above, the function of Full Adder/Subtracter 20 was to generate the initial sum or difference of the two streams of input data presented at input terminals 30 and 31. The first stream of input data is denoted by the signal PRI which is applied at input terminal 30. This signal is fed through inverter 71 to form signal $\overline{PRI}$. These two signals, PRI and $\overline{PRI}$ will be used as inputs to the gates 78—81 which form the one bit sum or difference and gates 82—85 which form the requisite carry or borrow as will be explained later.

The second stream of the input data denoted SEC is fed in at input terminal 31 and then fed through inverter 72 to form a signal $\overline{SEC}$. Both of these signals SEC and $\overline{SEC}$ will be utilized by the addition/subtraction gates 78—81 and the carry/borrow gates 82—85.

Any carries or borrows generated during preceding additions or subtractions are denoted by the signal C/B which is applied at input terminal 34 and then fed through inverter 73 to form the signal $\overline{C/B}$.

Gate 74 has two inputs, $\overline{PRI}$ and $\overline{C/B}$ so that its output is represented by the signal PRI + C/B. Similarly, gate 75 has as its inputs $\overline{SEC}$ and $\overline{C/B}$ so that its output is represented by the signal SEC + C/B. Both these signals will be utilized in the carry borrow gates 82—85 which will be explained later.

The signals N1 and N2 (whose function was explained above) are applied at input terminals 32 and 33. Signal N1 is fed through inverter 76 to form signal $\overline{N1}$ and signal N2 is fed through inverter 77 to form signal $\overline{N2}$. All four of the signals, N1, $\overline{N1}$ N2, $\overline{N2}$ are fed to the inputs of the carry/borrow gates 82—85.

Referring now to the sum/difference gates 78—81, it is well known that the expression for the sum or difference of two binary numbers, indicating the presence of a carry or borrow, is defined according to the relationship:

$$\text{SUM OR DIFFERENCE} = \text{PRI}\ \overline{\text{SEC}}\ \overline{\text{C/B}} + \overline{\text{PRI}}\ \text{SEC}\ \overline{\text{C/B}} + \overline{\text{PRI}}\ \overline{\text{SEC}}\ \text{C/B} + PRI\ SEC\ C/B$$

It will be seen, that the first part of this expression, PRI $\overline{\text{SEC}}$ $\overline{\text{C/B}}$, is satisfied by gate 78. The second part of this expression, $\overline{\text{PRI}}$ SEC $\overline{\text{C/B}}$, is satisfied by gate 79. The third part of the expression, $\overline{\text{PRI}}$ $\overline{\text{SEC}}$ C/B, is satisfied by gate 80 and the fourth part of the expression, PRI SEC C/B, is satisfied by gate 81. The outputs of gates 78, 79, 80, 81 are fed to form the four inputs of gate 86 whose output then is the sum or difference represented by the original expression.

Similarly, carry/borrow gates 82, 83, 84, 85 are used to generate the carries or borrows which result from the addition of one bit. If the operation in the Adder/Subtracter 20 is addition, it can be shown that the expression for indicating the presence of a carry is:

$$\text{CARRY} = \text{PRI·SEC} + \text{PRI·}\overline{\text{SEC}}\text{·C/B} + \overline{\text{PRI}}\text{·SEC·C/B} + \text{PRI·SEC·C/B}$$

It will be seen that the first part of this expression PRI SEC, is provided by gate 85. The second part of the expression, PRI·$\overline{\text{SEC}}$·C/B, is also provided by gate 85. The third part of the expression, $\overline{\text{PRI}}$·SEC·C/B, is provided by gate 84 and the fourth part of the expression, PRI·SEC·C/B, is provided by gate 81.

While the operation is in subtraction, reference to Table 1 above shows that signal N1 is a logic one and signal N2 is a logic zero when PRI-SEC is desired. Accordingly, it will be seen that the presence of signal $\overline{N1}$ at gates 82, 84 and 85 disable those three gates during operation in N1 (PRI-SEC) mode. Hence, gate 83 functions to provide the requisite borrow in N1 mode in accordance with the following relation:

$$\text{BORROW (N1 MODE)} = \overline{\text{PRI}}\text{·(SEC + C/B)} + \text{PRI·SEC·C/B}$$

the first part of this expression, $\overline{\text{PRI}}$·(SEC + C/B), is provided by gate 83 whereas the second part, PRI·SEC·C/B, is provided by gate 81.

Finally, it will be seen by reference to Table 1 above that when it is desired to subtract signal PRI from SEC, signal N2 is a logic one and signal N1 is a logic zero. Accordingly, the presence of signal $\overline{N2}$ on gates 83, 84 and 85 renders those three gates inoperative and hence gate 82 is operative to provide the requisite borrow in N2 (SEC-PRI) mode, according to the expression:

$$\text{BORROW (N2 MODE)} = \overline{\text{SEC}}\text{·(PRI + C/B)} + \text{PRI·C/B·SEC}$$

the first part of this expression, $\overline{\text{SEC}}$ (PRI + C/B), is provided by gate 82 whereas the second part, PRI·C/B·SEC, is provided by gate 81.

Finally, gate 87 is operative to relay any carries or borrows generated in the carry/borrow gates 82—85 as well as the carry generated by gate 81. Hence, the outputs of gates 81—85 form the first five inputs to gate 87. The sixth input of gate 87 is provided for the purpose of relaying any decimal carries which are relayed into Full Adder/Subtracter 20 by way of input terminal 37. The output of gate 87 is then connected to output terminal 36 for the purpose of relaying spirit any carries or borrows generated by Full Adder/Subtracter 20.

OPERATION OF CARRY/BORROW SELECTION AND STORAGE CIRCUIT 21

Referring now to FIG. 6 there is shown a detailed logic diagram of the Carry/Borrow Section and Storage Circuit 21 shown in FIG. 1. While the particular Carry/Borrow Section and Storage Circuit shown is adapted to handle a system utilizing three interlaced words, it should be pointed out that any number of interlaced words, according to the desired input format, can be used without departing from the s of the invention.

Assuming that operation in Full Adder/Subtracter 20 is presently on word one, signal W1 will be a logic one and signals W2 and W3 will be logic zero. Accordingly, when a carry or borrow is received at input terminal 39, the set steering requirements for Word One flip-flop 91 will be satisfied and at the next clock pulse, C, flip-flop 91 will set. When flip-flop 91 sets, the signal at output terminal 1 of flip-flop 91 goes to the logic one state. This terminal is connected to form one input of gate 94. The second input to gate 94 is connected to signal W1 which is also a logic one at this time. The third input to gate 94 comes from the output of inverter 99. Its function will be explained later, but during normal addition and subtraction, the output of inverter 99 remains at logic one. Accordingly, the output of gate 94 will be a logic zero. The output of gate 94 forms one input to gate 97. Accordingly, when the output to gate 94 goes to logic zero, the output of gate 97 will go to logic one. In this fashion, any carries or borrows generated during one but time in word one time are stored in flip-flop 91 using the next bit time and relayed by output terminal 38 to the Carry/Borrow In terminal 34 of Full Adder/Subtracter 20. It will be noted that if the carry or borrow in question was generated during W1B4 time, it will remain stored in flip-flop 91 until the next digit of W1 is processed at which time it will be relayed to the Carry/Borrow In terminal 34 of Full Adder/Subtracter 20. Similarly, if no carry or borrow is generated, the signal at input terminal 39 is a logic zero. The signal is fed through an inverter 98 and becomes a logic one which satisfies the reset steering requirements of flip-flop 91. Accordingly, at the next clock time, C, flip-flop 91 will reset and therefore will not relay a carry or borrow.

Operation is identical during W2 and W3 times, with flip-flop 92 serving to store any carries or borrows generated during word two (W2) time and flip-flop 93 serving to store any carries or borrows generated during word three (W3) time. Similarly, carries which are generated during the word two time are relayed by gate 95 to form one input to gate 97 whereas carries stored during word three time are relayed by gate 96 to form one input of gate 97.

It was noted above that it may sometimes be desirable to suppress carries or borrows stored in Carry/Borrow Selection and Storage Circuit 21. This may be desired, for example, when the result of a subtraction in Full Adder/Subtracter 20 is to be complemented by Full Adder/Subtracter 26. It may also be desirable when a carry or borrow resulted during the processing of the most significant digit of a word, in order to prevent relaying this carry or borrow during the processing of the least significant digit during the subsequent operation.

Whenever it is desired to suppress a carry or borrow, signal Block Carry which is fed into terminal 68 goes to logic one. Terminal 68 is connected to the input of inverter 99 whose output forms the third input to gates 94, 95, and 96. Hence, when signal block Carry goes to logic one the output of inverter 99 goes to logic zero thereby preventing any carries or borrows stored in flip-flops 91, 92, 93 from being relayed to the Carry/Borrow Out terminal 38.

OPERATION OF THE SIX CORRECTION RECOGNITION AND GENERATION CIRCUIT 25

Figure 7:
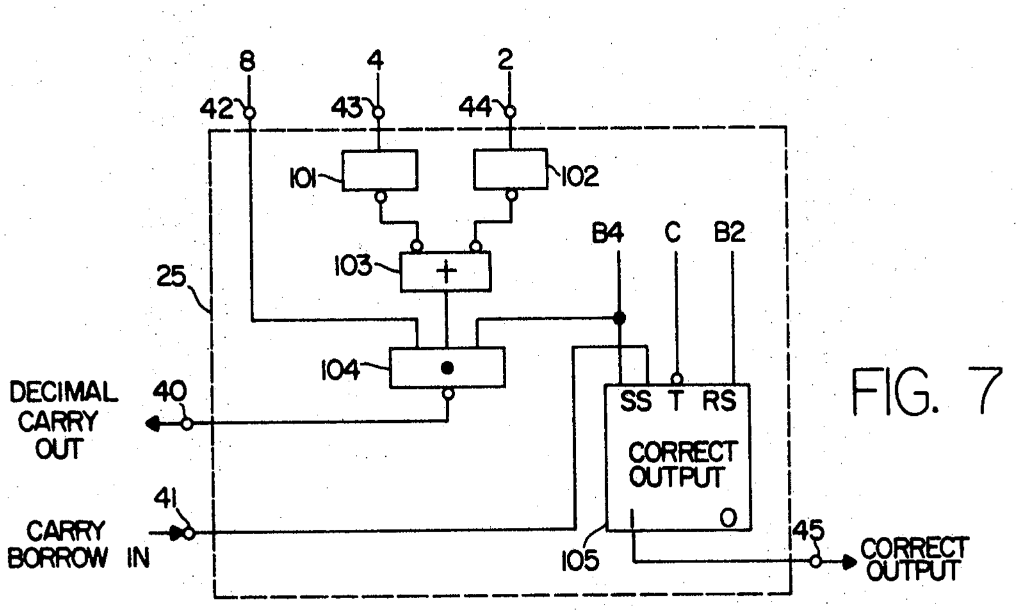
FIG. 7 is a logic diagram of the "Six Correction Recognition and Generation" circuit of FIG 1

Turning now to FIG. 7, there is shown the detailed logic diagram of the Six Correction Recognition and Generation Circuit 25 shown in FIG. 1. As was pointed out in the description of the Adder/Subtracter/Complementer, the purpose of the Six Correction Recognition and Generation Circuit 25 is to recognize an improper result which may be generated by Full Adder/Subtracter 20 and to generate the necessary correction. As was also pointed out, an improper result may be indicated in two ways. The first way is by the recognition of a sum from Full Adder/Subtracter 20 which is in excess of 9. The second indication of a need for correction is the presence of a carry or borrow during B4 time.

The first of these conditions is recognized by gates 101, 102, 103, and 104. The first input to gate 104 comes from input terminal 42 which is connected to the output terminal 35 of Full Adder/Subtracter 20. The second input to gate 104 is the signal B4 which serves to activate this gate only during bit 4 time. During bit 4 time, the most significant bit of the BCD sum or difference will be present at output terminal 35 of Full Adder/Subtracter 20. Accordingly, this signal which is connected to input terminal 42 is labeled 8 since it is, during bit 4 time, indicative of the most significant bit of BCD result. Similarly, since One Bit Delay 22 is connected to the output of Full Adder/Subtracter 20, the output of One Bit Delay 22 which is connected to input terminal 43 will be indicative of the third bit of the BCD result and hence is labeled 4. Similarly, the output of One Bit Delay 23, during bit 4 time, is indicative of the second bit of the BCD result and accordingly it is connected to input terminal 44 and labeled 2. Terminal 43 is connected to the input of inverter 101 and terminal 44 is connected to the input of inverter 102. The output of inverters 101 and 102 form the two inputs to gate 103 so that the output of gate 103 will be a logic one whenever either or both of the signals at terminals 43 and 44 are logic ones. Hence, the output of gate 104 will be a logic zero any time the BCD sum or difference generated by Full Adder/Subtracter 20 is in excess of 9, i.e., 8·(4+2) in binary notation. This signal is relayed to output terminal 40 which is connected to Decimal Carry In terminal 37 of Full Adder/Subtracter 20 in order to produce an output at Carry/Borrow Out terminal 36.

As was noted above, the presence of a carry or borrow TS·6C·4 time is also indicative of the need for correction and will produce TS·6C·at Carry/Borrow Out terminal 36. Carry/Borrow Out terminal 36 is connected TS·6C·TS·6C· to the Carry/Borrow In terminal 41 of Six Correction Recognition and Generation Circuit 25. This signal forms one of the set steering inputs to Correct Output Flip-flop 105. The other set steering input is the signal B4 which activates this flip-flop to set at the next clock pulse following any carries generated during bit 4 time. Flip-flop 105 is reset steered by signal B2 so that after it is set, it stays set for two bit times and therefore generates the number 6 in BCD form (0110). This signal is relayed to output terminal 45 whenever correction is needed.

OPERATION OF FULL ADDER/SUBTRACTER 26

Figure 8:
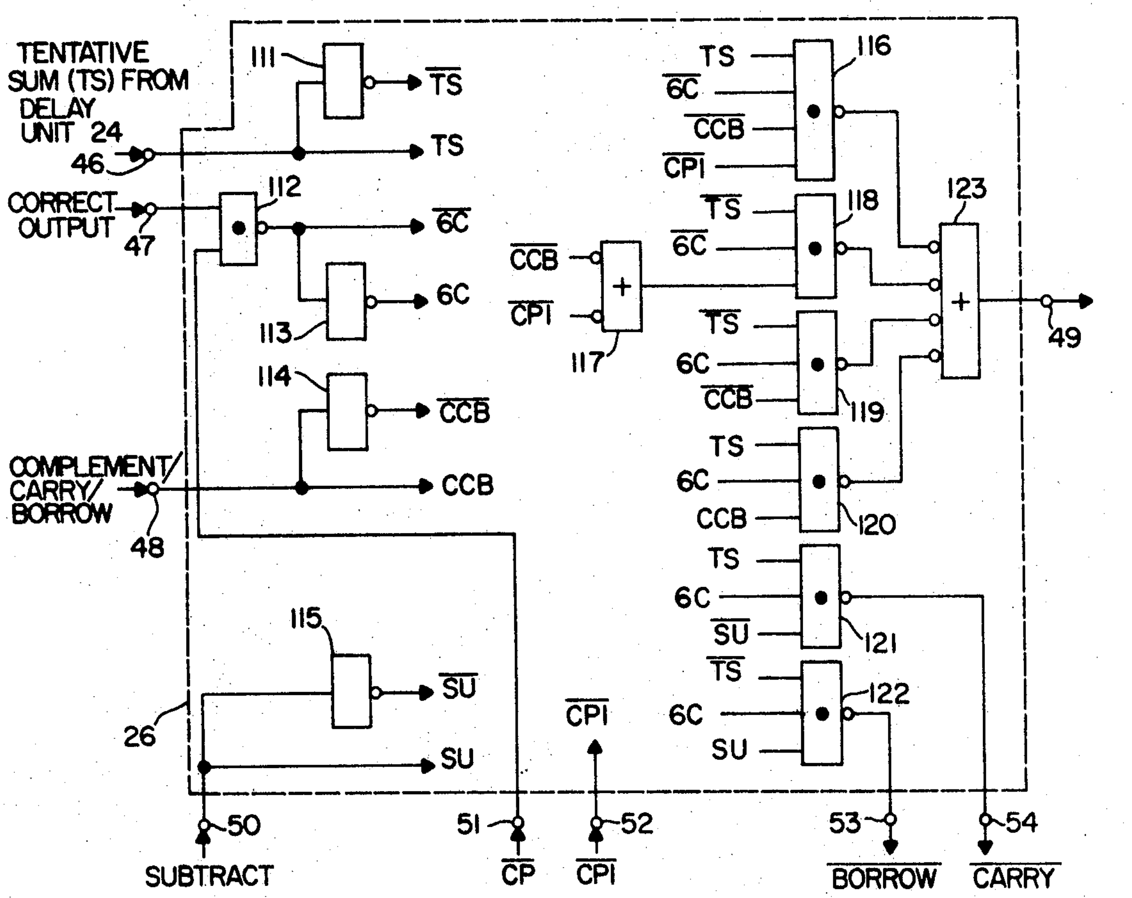
FIG. 8 is a logic diagram of the second "Full Adder/Subtracter" of FIG. 1.

Referring now to FIG. 8, there is shown a detailed logic diagram of the modified Full Adder/Subtracter 26. Signal TS, which is the tentative sum from One Bit Delay 24, is fed into Adder/Subtracter 26 by input terminal 46. Inverter 111 is connected to terminal 46 so that the output of the converter 111 is the signal $\overline{TS}$. The output of the Six Correction Recognition and Generation Circuit 25 is connected to input terminal 47 of Adder/Subtracter 26. Gate 112 has one of its inputs connected to input terminal 47. The other input is connected to input terminal 51 to which the signal $\overline{CP}$ is connected from the Carry/Borrow Storage and Complement Control 27 which will be explained later. At this point, it is sufficient to note that during normal addition and subtraction, signal $\overline{CP}$ is a logic one. Accordingly, the output of gate 112 is indicative of the correction digit and therefore is labeled $\overline{6C}$. The output of gate 112 is fed to form the input inverter 113 whose output signal is labeled 6C.

Input terminal 48 receives the signal Complement/Carry/Borrow (CCB) from Carry/Borrow Storage and Complement Control 27. During normal addition and subtraction operation, the carries or borrows generated during operation on subsequent digits are relayed to this terminal. The input to inverter 114 is connected to terminal 48 and the output of inverter 114 then forms the signal $\overline{CCB}$. Terminal 50 of Adder/Subtracter 26 relays a signal which indicates whether the desired operation is addition or subtraction. This signal, labeled SU is a logic one whenever subtraction is desired. The input to inverter 115 is connected to input terminal 50 so that the output of inverter 115 forms the signal $\overline{SU}$. The input terminals 51 and 52 are equipped to receive the signals $\overline{CP}$ and $\overline{CP1}$ from the Carry/Borrow Storage and Complement Control 27. The function of these inputs and the signals thereon will be explained later during the explanation of operation when the unit is required to complement. During normal addition and subtraction, signals $\overline{CP}$ and $\overline{CP1}$ remain at logic one reel.

In a fashion similar to that outlined during the explanation of Full Adder/Subtracter 20, it can be shown that the equation governing the sum or difference generated by Adder/Subtracter 26 is: $\overline{SUM\ OR\ DIFFERENCE} = TS\cdot\overline{6C}\cdot\overline{CCB} + \overline{TS}\cdot\overline{6C}\cdot CCB + \overline{TS}\cdot 6C\cdot\overline{CCB} + TS\cdot 6C\cdot CCB$ Accordingly, it is seen that the first part of this expression, $TS\cdot\overline{6C}\cdot\overline{CCB}$, is provided by gate 116. Similarly, the second part of this expression, $\overline{TS}\cdot\overline{6C}\cdot CCB$, is provided by gate 118. The third part of this expression, $\overline{TS}\cdot 6C\cdot\overline{CCB}$, is provided by gate 119 and the fourth part, $TS\cdot 6C\cdot CCB$, is provided by gate 120. The outputs of gates 116, 118, 119, 120 form the four inputs to gate 123 whose output is then indicative of the sum or difference generated therein and is relayed to output terminal 49.

In addition, gate 121 is provided for generating any carries which result from the manipulations in Adder/Subtracter 26. It can be shown that the first carry which results from an addition in Adder/Subtracter 26 is governed by the relationship; $CARRY = TS\cdot 6C\cdot\overline{SU}$. This relationship is provided by gate 123. It can further be shown that, since the number being added to the tentative sum TS is always six (0110) in binary coded decimal, once a carry is generated in Adder/Subtracter 26, there will continue to be carries from each manipulation throughout the processing of that particular digit. Accordingly, the output of gate 121 is fed to terminal 54 to generate the first carry out of Adder/Subtracter 26 for each digit.

Similarly, it can be shown that the first borrow from Adder/Subtracter 26 results according to the expression: $BORROW = \overline{TS}\cdot 6C\cdot SU$. This relationship is provided by gate 122. Similarly when the first borrow during operation on a digit has been generated, the remainder of the subtraction on that digit will continue to require borrows and accordingly the output of gate 122 is fed to terminal 53 to provide an indication of the first borrow which results during the subtraction in Adder/Subtracter 26.

Operation of the Adder/Subtracter 26 to complement will be explained in detail hereinafter, following the explanation of the Carry/Borrow Storage and Complement Control 27.

CARRY/BORROW STORAGE AND COMPLEMENT CONTROL 27

Figure 9:
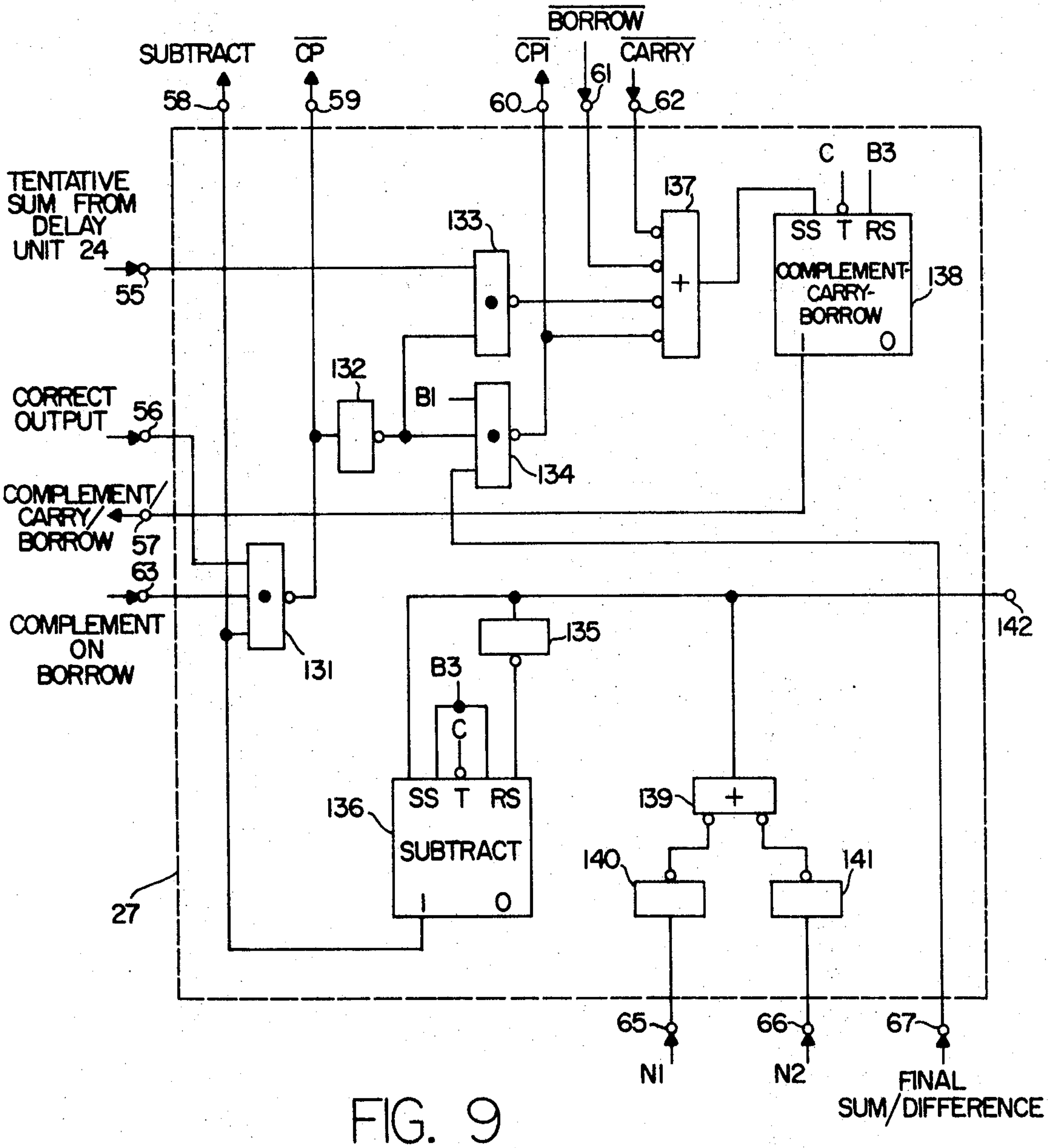
FIG. 9 is a logic diagram of the "Carry/Borrow Storage and Complement Control" of FIG. 1.

Referring now to FIG. 9, there is shown a detailed logic diagram of the Carry/Borrow Storage and Complement Control circuit 27. The function of the flip-flop 138 is to store and relay carries or borrows, as well as controlling the complementing of the input to Adder/Subtracter 26 when desired. With respect to the handling of carries or borrows, it can be seen that whenever there is a carry generated by Adder/Subtracter 26, the signal "$\overline{\text{Carry}}$" at input terminal 62 of the Carry/Borrow Storage and Complement Control 27 goes to logic zero. Terminal 62 is connected to one input of gate 137 so that when a carry is generated the output of gate 137 goes to logic one and flip-flop 138 sets at the next clock time, C. When flip-flop 138 sets, the output on output terminal 1 goes to logic one thereby relaying a carry out of Carry/Borrow Storage and Complement Control 27 on terminal 57. Similarly, whenever a borrow is generated by Adder/Subtracter 26, the signal "$\overline{\text{Borrow}}$" on input terminal 61 of Carry/Borrow Storage and Complement Control 27 goes to logic zero. Terminal 61 is connected to a second input of gate 137 so that the output of gate 137 goes to logic one when the first borrow is generated. Accordingly, flip-flop 138 sets at the next clock pulse, C, and relays this borrow during the next bit time via output terminal 57. It will be seen that once flip-flop 138 sets, it does not reset until B3 time. This is due to the fact that, as pointed out above, after the first carry or borrow is generated, carries or borrows continue to be generated during the remainder of the addition or subtraction in that particular digit and accordingly the flip-flop 138 will stay set throughout the operation on that digit.

Before going into a detailed explanation of operation during complementing, it may be convenient to briefly review the method of generating the two's complement of a binary number. When it is desired to generate the two's complement, it is only necessary to examine the binary bits in ascending order until detecting a bit which is a logic one. The first bit which is a logic one and all preceding bits remain unchanged. The remainder of the binary bits are inverted so that if they were a logic one they are changed to logic zero and if they were a logic zero they are changed to logic one.

Suppose it is desired to obtain the two's complement of the binary digit 1010. It can be seen that the first bit of the number to be complemented was a logic zero which is unchanged. The second bit is a logic one and is first bit containing a logic one, and it accordingly is also unchanged. The third bit was a logic zero so it becomes a logic one. The fourth bit was a logic one and when inverted becomes a logic 0. The result of this procedure is 0110, the two's complement of 1010. Accordingly, whenever it is desired to generate the two's complement of a binary number it is only necessary to recognize the first bit containing a logic one leaving it and all preceding bits unchanged, and then invert the remaining bits of that digit.

Referring now to FIGS. 8 and 9, there is shown at input terminal 63 of Carry/Borrow Storage and Complement Control 27 a signal labeled COB which stands for "Complement On Borrow." When this signal goes to logic one, the Adder/Subtracter 26 is instructed to complement the input at terminal 46 if there has been a borrow during the B4 time during the subtraction in Adder/Subtracter 20. It will be noted that it is only necessary to complement during subtraction. Accordingly, input terminals 65 and 66 have signals N1 and N2, respectively, connected thereto. Terminal 65 is connected to the input of inverter 140 and terminal 66 is connected to the input of inverter 141. The outputs of inverters 140 and 141 are connected to form the two inputs to gate 139 so that the output of gate 139 is a logic one when the operation in the system is subtraction. The output of gate 139 is fed to one of the set steering inputs of flip-flop 136. It is also fed to form the input of inverter 135 whose output is fed to the reset steering input of flip-flop 136. Signal B3 is connected to both the set and reset steering inputs of flip-flop 136 so that if the operation was subtraction, the set steering requirements will be satisfied at B3 time and the next clock pulse, C, causes flip-flop 136 to set. Conversely, if the addition was not subtraction, the reset steering requirements to flip-flop 136 will be satisfied during B3 time and during the next clock pulse, C, flip-flop 136 will reset.

The 1 output of flip-flop 136 forms a second input to gate 131 and will be a logic one when the operation is subtraction. The final input to gate 131 is connected to input terminal 56 which has the signal Correct Output connected thereto. As was pointed out during the discussion relative to the operation of the Six Correction Recognition and Generation Circuit 25, the Correct Output signal goes to logic one at B1 time if there has been a borrow from Adder/Subtracter 20 during B4 time. Accordingly, if signal COB is a logic one, and flip-flop 136 is set, and a borrow occurs during B4 time all three inputs to gate 131 will be logic one, and the output of gate 131 will be logic zero. The output of gate 131 is fed to output terminal 59. This output which is labeled $\overline{\text{CP}}$, will be a logic zero when complementing is desired.

It is pertinent to note the status of the digit being relayed through the system at B1 time. At B1 time, the least significant bit of the digit is presented at the output of One Bit Delay 28. The second least significant bit is present at the input terminal 46 of Full Adder/Subtracter 26. The third bit is presented at the output of One Bit Delay 23 and the fourth bit is presented at the output of One Bit Delay 22. Since the first bit will always be the same, after complementing, it is not necessary to make any change in it when complementing is desired. However, if the first bit is a one, it will be necessary to invert the second bit. This is accomplished by gate 134.

One input to gate 134 is the timing signal B1. The second input to gate 134 is the output of inverter 132 whose input is connected to the output of gate 131. The output of inverter 132 will be a logic one when complementing is desired. The third input to gate 134 comes from input terminal 67 which is connected to the output of One Bit Delay 28. This signal will be a logic one if the first bit of the final difference is a logic one. Under these conditions, the output of gate 134 would be a logic zero. This output forms one input to gate 137 such that the output of gate 137 is a logic one which steers flip-flop 138 to set at the next clock time. Accordingly, if the first bit of the tentative difference was a logic one, signals $\overline{\text{CP}}$ and $\overline{\text{CP1}}$ will both be logic zeros. Signal $\overline{\text{CP}}$ is connected via terminal 51 to one input of gate 112 whose output signal $\overline{\text{6C}}$ will then be a logic one while signal 6C will be a logic zero. The fact that signal 6C is a logic zero will disable gates 119 and 120. Similarly, the presence of signal $\overline{\text{CP1}}$ on one of the inputs to gate 116 renders it inoperative during this time.

Hence, if the second bit of a tentative sum relating Adder/Subtracter 26 is a logic one, the presence of signal $\overline{\text{TS}}$ on gate 118 causes that gate to be inoperative and hence all four of the gates 116, 118, 119, 120 are inoperative. Accordingly, the output of gate 123 will be a logic zero which is the inverse of the second bit of the tentative sum.

On the other hand, if the signal TS is a logic zero then all three inputs to gate 118 are logic one which makes the output of gate 118 a logic zero. Accordingly the output of gate 123 is a logic one which is the inverse of the input. This is accomplished by virtue of the fact that input signal $\overline{\text{TS}}$ is a logic one, signal $\overline{\text{6C}}$ is a logic one and the output of gate 117 is a logic one by virtue of the presence of the signal $\overline{\text{CP1}}$ at one of its inputs.

It will be seen that as previously pointed out above, when the first bit of the tentative sum is a logic one, flip-flop 138 in the Carry Borrow Storage and Complement Control 27 is set at the next clock time, C. If flip-flop 138 is set then signal CCB, which forms the input on terminal 48 of Adder/Subtracter 26, is a logic one. Hence, signal $\overline{CCB}$ is a logic zero. This causes gates 116 and 119 to be disabled so along as signal $\overline{CCB}$ is a logic zero. Further, as was pointed out above, signal 6C is a logic zero which disables gate 120. Hence, gate 118 acts to accomplish the necessary inversion of the input signal TS. One of the inputs to gate 118 is the output of gate 117 which will be a logic one since signal $\overline{CCB}$ is logic zero. The second input to gate 118, signal $\overline{6C}$, is a logic one. The third input to gate 118 is the tentative sum. If the incoming bit is a logic zero, all three inputs to gate 118 are satisfied, its output will be logic zero and the output of gate 123 will be a logic one, thereby inverting the input signal TS. On the other hand, if signal TS is a logic one, then all four gates 116, 118, 119, 120 are inoperative and the output signal from gate 123 is a logic zero, which is the requisite inverse of the input.

If, however, the least significant bit is not a one, the inputs to gate 134 are not satisfied. In this situation, it is noted that the output of inverter 132 forms one input to gate 133. The other input to gate 133 is the tentative sum which is being simultaneously circulated into the Adder/Subtracter 26. If the second, or third bit is the first bit containing a logic one, the requirements of gate 133 will be satisfied upon the occurrence of the bit containing a logic one. Accordingly, the output of gate 133 is fed to form one input to gate 137 so that flip-flop 138 sets at the next clock time. In this fashion, the first bit which contains a logic one circulates through Adder/Subtracter 26 without change and the remaining bits are inverted as described above.

ILLUSTRATION OF THE OPERATION OF THE INVENTION

Figure 10:
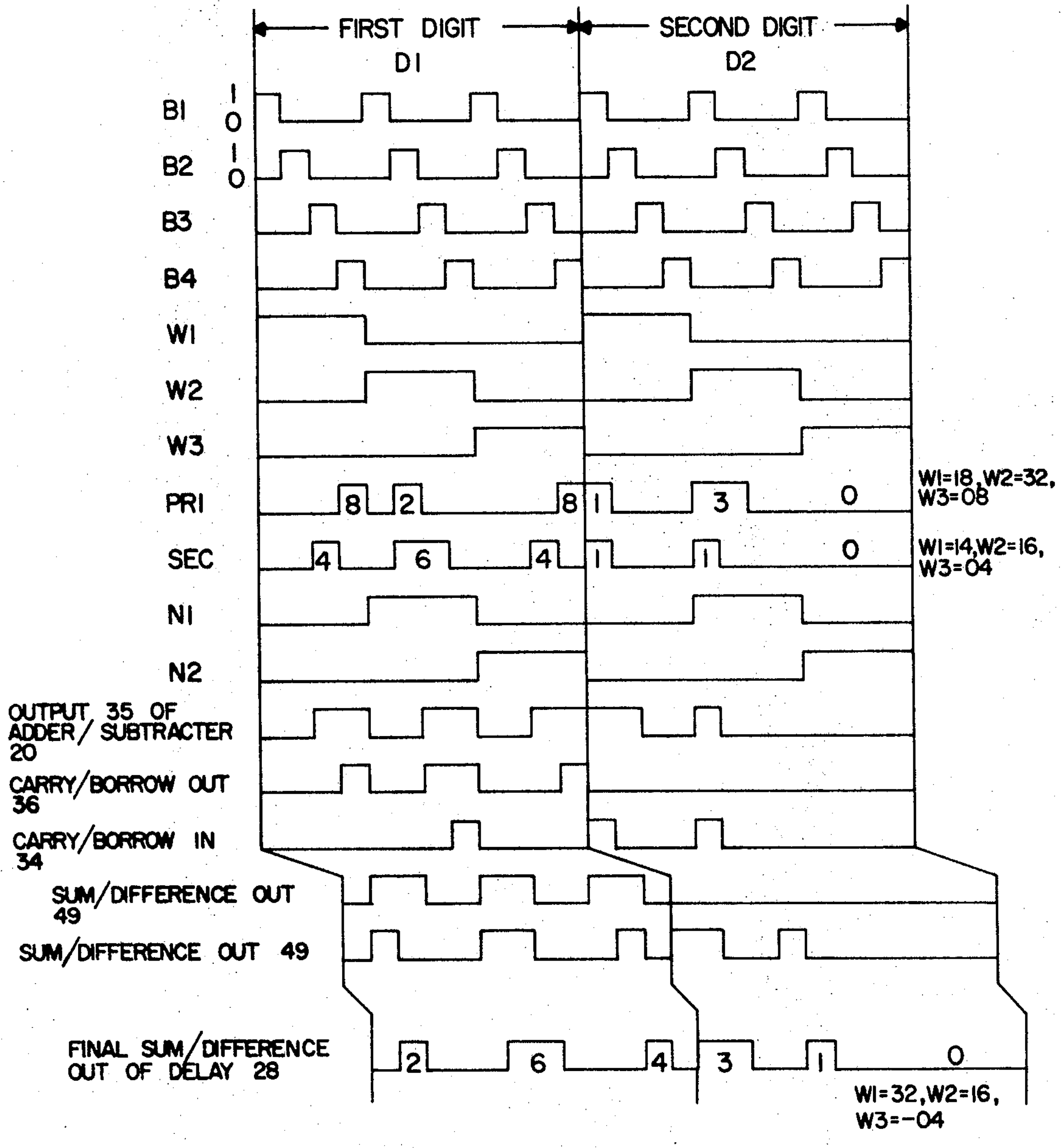
FIG. 10 is a series of waveforms illustrating the operation of the serial adder/subtracter/complementer comprising the invention.

Referring now to FIG. 10, there is shown a series of waveforms illustrating the operation of the serial Adder/Subtracter/Complementer comprising the subject invention. The first seven waveforms are reproductions of similarly labeled waveforms shown in FIG. 3. Waveforms B1, B2, B3 and B4 are indicative of the four "bit" times while waveforms W1, W2 and W3 are indicative of the three "word" times. In addition, the drawing is divided by means of vertical lines indicating the two digits.

For the purposes of this example, the primary data marked PRI is such that W1 equals 18, W2 equals 32 and W3 equals 08 while the secondary data, labels SEC, is interlaced such that W1 equals 14, W2 equals 16 and W3 equals 04. Further, for the purposes of this example, assume that the operation desired on W1 is to be PRI + SEC, that the operation on W2 is to be PRI − SEC and that the operation on W3 is to be SEC − PRI.

During W1 time it will be seen that the waveform labeled "N1" is a logic zero as is the waveform labeled "N2." This calls for the operation to be PRI + SEC.

The waveform labeled "Output 35 of Adder/Subtracter 20" indicates the result of the addition or subtraction in Adder/Subtracter 20. During B1-B4W1D1 times, the addition of eight (0001) and four (0010) in binary coded decimal results in 0011 as the output of Adder/Subtracter 20. This result is obviously not a proper BCD sum since it equals twelve in pure binary. Accordingly, it will be necessary to correct this output by the addition of six in Adder/Subtracter 26. It can be seen that the signal labeled "Correct Output 45" (which is displaced by three bit times to accommodate for the three bits of delay in the three one bit delay units 22, 23 and 24) generates the required six (0110). The result of this addition in Adder/Subtracter 26 is to generate the appropriate result, i.e., two (0100), which is shown by the waveform labeled "-Sum/Difference Out 49."

During B1—B4W2D1 times, signal N1 is a logic one and signal N2 is a logic zero, thereby instructing Adder/Subtracter 20 to subtract the data labeled SEC from the 49." PRI. The result of this subtraction is shown during B1-B4W2D1 times in the waveform labeled "Output of Adder/Subtracter 20." Since this operation resulted in a borrow during bit four time, it is necessary to correct this result by subtracting six (0110) in Adder/Subtracter 26. Accordingly, the waveform labeled "-Correct Output 45" again generates the number six (0110) in binary coded decimal. The result of subtracting six in binary coded decimal is shown in the waveform labeled "Sum/Difference Out 49" which indicates the appropriate result, i.e., six (0110).

During B1—B4W3D1 times, signal N2 is a logic one and signal N1 is a logic zero thereby instructing Adder/Subtracter 20 to subtract the data labeled PRI from the data labeled SEC. The result of this subtraction is shown during B1—B4W3D1 times in the waveform labeled "Output 35 of Adder/Subtracter 20." Since this subtraction also resulted in a borrow during B4 time, it is once again necessary to generate the number six for subtraction from the original sum in the Adder/Subtracter 26. However, in this particular example, it is noted that the result of subtracting 08 from 04 is to generate a negative number. Accordingly, the modified Adder/Subtracter 26 should be instructed to complement rather than correct the result of the subtraction in Adder/Subtracter 20. The need for this instruction may be recognized, for example, by examining these words prior to performing the subtraction. Hence, as was pointed out in the description of the Carry/Borrow Storage and Complement Control 27, the correction generated by the Six Correction Recognition and Generation Circuit 25 is suppressed and, rather than correcting, Adder/Subtracter 26 operates to complement the improper result. This improper result, which is seen during B1—B4W3D1 times in the waveform "Output 35 of Adder/Subtracter 20" is, in binary notation, 0011. Accordingly, the complement is achieved by examining the bits in ascending order until the first bit is a logic one, leaving that bit as it is and inverting all remaining bits. Hence, when complementing 0011, the first bit is a zero which remains unchanged. The second bit is also a zero which remains unchanged. The third bit is the first bit containing a logic one so it is also passed unchanged but the next bit which was a logic one is inverted and now becomes a logic zero. Accordingly, the two's complement of 0011 is 0010, which is shown delayed by three bit times in the waveform "Sum/Difference Out 49."

Before examining in detail the manipulation on the second digits of these three interlaced words, it should be noted that there were four carries or borrows generated during the manipulation on the first digits. The first, a carry generated at B4W1D1 time, is shown at B4W1D1 time in the waveform labeled "Carry/Borrow Out 36." Since this carry was generated during B4 time it is not relayed to the Adder/Subtracter 20 during the next bit time but instead is stored by flip-flop 91 (FIG. 6) until the next digit of W1 arrives. The second is a borrow, generated at B3W2D1 time, as shown in the waveform labeled "Carry/Borrow Out 36." This borrow is held for one bit time in flip-flop 92 (FIG. 6) and then relayed to the Carry/Borrow In terminal 34 of Full Adder/Subtracter 20 as shown in waveform labeled "Carry/Borrow In 34" at B4W2D1 time. A third borrow is generated during B4W2D1 time. This borrow, shown at B4W2D1 time in the waveform labeled "Carry/Borrow Out 36" is not relayed to the Adder/Subtracter 20 during the next bit time. It is stored by flip-flop 92 (FIG. 6) until the next digit of W2 arrives.

Similarly, it is noted that a borrow is generated during B4W3D1 time. Since this borrow is generated during B4 time, it is not relayed to the input of Adder/Subtracter 20 at the next bit time but rather will be stored by the Carry/Borrow Selection and Storage Circuit 21 in flip-flop 93 (FIG. 6) until the next time a digit of W3 is processed. In this particular example, however, this borrow will not be relayed during subsequent processing of W3 because the result of this subtraction is to yield a negative result which is handled by complementing as pointed out above. This is accomplished by generating the signal Block Carry at B1W3D2 time, as pointed out above in the description of the Carry/Borrow selection and Storage Circuit 21.

During the processing of the second digits, it is shown that during B1—B4W1D2 times the three waveforms labeled PRI, SEC and Carry/Borrow In 34 are added together. The carry shown in the waveform "Carry/Borrow In 34" is the carry stored as a result of addition during B1—B4W1D1 times. The result of this addition is shown during B1—B4W1D2 times in the waveform labeled "Output 35 of Adder/Subtracter 20." During B1—B4W2D2 times the signal N1 is a logic one and the signal in N2 is a logic zero thereby instructing Adder/Subtracter 20 to subtract the data labeled SEC from the data labeled PRI. The result of this subtraction is shown during B1—B4W2D2 times in the waveform labeled "Output 35 of Adder/Subtracter 20" and reflects the effect of the borrow which is stored as a result of the manipulations in Adder/Subtracter 20 during B1—B4W2D1 times. Finally, during B1—B4W3D2 times, signal N2 is a logic one while signal N1 is a logic zero thereby instructing the Adder/Subtracter 20 to subtract the data labeled PRI from the data labeled SEC. Since both digits are zero and there is no input on Carry/Borrow In 34, the result of this subtraction is zero.

The result of these additions, subtractions and complementing is shown finally in the waveform labeled "Final Sum/Difference out of Delay Unit 28" which reflects the answer delayed by four bit times from the input data. The results are $W1$=18az14=32; $W2$=32−16=16; and $W3$=04−08=04.

While the foregoing has been a description of a particular embodiment illustrating the invention, the appended claims are intended to cover all forms which fall within the scope of the invention.

I claim:

1. A multiple input apparatus for computing data wherein said data at each of said inputs comprises a plurality of words each of "N" decimal digits, each of said digits being expressed in binary coded decimal format, said data being repetitively interlaced such that the Nth digit of each of 1)the plurality of words is presented followed by the (N—1)th decimal digit of each of said words and wherein each digit is presented by presenting the four binary bits of the BCD code in ascending order and wherein all of said data is so interlaced, comprising:

a. first means for sequentially adding or subtracting said input words on a bit-by-bit basis, one decimal digit at a time; said first means generating at its output either sum or difference and carries or borrows;
b. storage means dimensioned to accept a number of bits not exceeding the number of bits occurring in any one digit operatively connected to the output of said first means for serially storing said sum or difference output;
c. recognition means operatively connected to said sum or difference and carries or borrows outputs of said first means and operatively connected to said storage means to recognize on a digit-by-digit basis an illegal binary coded decimal addition or subtraction result during the operation in said first means;
d. generating means operatively connected to said recognition means to generate the number six in BCD form whenever said recognition means recognizes an illegal binary coded decimal addition or subtraction result;
e. second means for sequentially adding or subtracting the output of said storage means and said generating means to produce a legal BCD addition or subtraction result, and means responsive to the subtraction result involving a reversal of sign to generate the two's complement of the subtraction result.

2. The apparatus as recited in claim 1 including a. means for indicating which of said plurality of words is presently being added or subtracted, and
b. a plurality of second storage means operatively connected to receive and store carries or borrows generated by said first means, each of said plurality of second storage means being individually operatively connected to one output of said word indicating means.

3. The apparatus as set forth in claim 1 wherein said first means comprises a full adder/subtracter.

4. The apparatus as set forth in claim 1 wherein said second means comprises a full adder/subtracter which is modified so as to generate the two's complement.

5. The apparatus as set forth in claim 1 wherein said recognition means comprises a. a first gating network operatively connected to said first means and said storage means which recognizes a sum in excess of 9 but less then 16 and
b. storage means to store the output of said first gating network or an output of said first means which is indicative of the generation of a binary carry during the processing of the most significant BCD bits of said digits.

6. A binary full adder/subtracter having first and second inputs for the input of binary data to be added or subtracted, a third input for the input of carries or borrows which resulted during the addition or subtraction of preceding bits of the same binary word and a fourth input for indicating either addition or subtraction, said adder/subtracter comprising:

a. a plurality of first gating means operatively connected to said first, second and third inputs for generating the binary sum or difference;
b. a plurality of second gating means operatively connected to said first, second, and fourth inputs for generating carries or borrows;
c. means for receiving a complementing signal commanding said adder/subtracter to generate the two's complement of said data at said first input; and
d. means for relaying said complementing signal to said plurality of first gating means so as to modify the operation of said plurality of said first gating means.

7. The full adder/subtracter as recited in claim 6 including means for generating said complementing signal only when a borrow is detected during the subtraction of the most significant bit of said input data at said first input.

8. The full one-bit binary adder/subtracter recited in claim 6 wherein said data at said third input is suppressed whenever said complementing signal is present.

9. A multiple input apparatus for computing data wherein said data at each of said inputs comprises a plurality of words each of "N" decimal digits, each of said digits being expressed in binary coded decimal format, said data being repetitively interlaced such that the Nth digit of said plurality of words is presented followed by the (N—1)th decimal digit of each of said words and wherein each digit is presented by presenting the four binary bits of the BCD code in ascending order and wherein all of said data is so interlaced, comprising:

a. first means for sequentially adding or subtracting said input words on a bit-by-bit basis, one decimal digit at a time; said first means generating at its output either sum or difference and carries or borrows;
b. storage means dimensioned to accept a number of bits not exceeding the number of bits occurring in any one digit operatively connected to the output of said first means for serially storing said sum or difference output;
c. recognition means operatively connected to said sum or difference and carries or borrows outputs of said first means and operatively connected to said storage means to recognize on a digit-by-digit basis an illegal binary coded decimal addition or subtraction result during the operation in said first means;
d. generating means operatively connected to said recognition means to generate the number six in BCD form whenever said recognition means recognizes an illegal binary coded decimal addition or subtraction result;
e. second means for sequentially adding or subtracting the output of said storage means and said generating means to produce a legal BCD addition or subtraction result, and means responsive to the subtraction result involving a reversal of sign to generate the two's complement of the subtraction result; said second means being additionally operative during a subtractive operation when the subtrahend and minuend are numbers containing nonzero representations in only the least significant digit position to generate the two's complement of the difference and to inhibit the propagation of a borrow to higher order digits only if the subtraction of the representations in the least significant digits positions results in a borrow.

10. A multiple input apparatus for computing data wherein said data at each of said inputs comprises a plurality of words each of "N" decimal digits, each of said digits being expressed in binary coded decimal format, said data being repetitively interlaced such that the Nth digit of each of said plurality of words is presented followed by the (N—1)th decimal digit of each of said words and wherein each digit is presented by presenting the four binary bits of the BCD code in ascending order and wherein all of said data is so interlaced, comprising:

a. first means for sequentially adding or subtracting said input words on a bit-by-bit basis, one decimal digit at a time; said first means generating at its output either sum or difference and carries or borrows;

b. storage means dimensioned to accept a number of bits not exceeding the number of bits occurring in any one digit operatively connected to the output of said first means for serially storing said sum or difference output;

c. recognition means operatively connected to said sum or difference and carries or borrows outputs of said first means and operatively connected to said storage means to recognize on a digit-by-digit basis an illegal binary coded decimal addition or subtraction result during the operation in said first means;

d. generating means operatively connected to said recognition means to generate the number six in BCD form whenever said recognition means recognizes an illegal binary coded decimal addition or subtraction result;

e. second means for sequentially adding or subtracting the output of said storage means and said generating means to produce a legal BCD addition or subtraction result, and means responsive to the subtraction result involving a reversal of sign to generate the two's complement of the subtraction result; said second means being additionally operative during a subtractive operation and when both the subtrahend and minuend are numbers containing nonzero representations in only the least significant digit position to generate the two's complement of the least significant digit of the difference only if the subtraction of the least significant digits results in a borrow.

11. An arrangement according to claim 10 where said second means also inhibits the propagation of a borrow to higher order digits when the two's complementing is performed.

12. A serial binary coded decimal adder/subtracter/complementer comprising first means for substantially simultaneously accepting corresponding bits of first and second binary coded decimal data words in the order of increasing significance of bits and then of digits, second means for indicating that additive or subtractive operations are to be performed, third means responsive to said second means for respectively sequentially performing additive or subtractive operations on said first and second data words, one decimal digit at a time to produce respectively sums or differences thereof, and a fourth means operative during given subtractive operations when the minuend and subtrahend have zeros in all digits positions except the least significant digit position and a borrow indication results from the subtraction of all the bits of the least significant digits of said first and second data words for indicating that the two's complement of the differences resulting from said subtractive operations is to be generated and fifth means responsive to said fourth means for executing a two's complementing operation.

13. An adder/subtracter/complementer as recited in claim 12 containing means effective only during a two's complementing operation to inhibit the propagation of borrows originating in the subtraction of the two digits of least significance.

14. An adder/subtracter/complementer as recited in claim 12 comprising storage means to temporarily store at least part of the tentative results of an initial subtractive computation until such time as the results of said subtraction of successive bits indicate whether the two's complement of the tentative result is to be generated and made available as output data.